United States Patent
Lynch et al.

(10) Patent No.: US 11,555,659 B2
(45) Date of Patent: Jan. 17, 2023

(54) MULTI-SCALE HEAT EXCHANGER CORE

(71) Applicant: Hamilton Sundstrand Corporation, Charlotte, NC (US)

(72) Inventors: Matthew E. Lynch, Canton, CT (US); Evan J. Butcher, Suffield, CT (US); Lawrence A. Binek, Glastonbury, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 238 days.

(21) Appl. No.: 17/127,034

(22) Filed: Dec. 18, 2020

(65) Prior Publication Data

US 2022/0205735 A1 Jun. 30, 2022

(51) Int. Cl.
F28F 1/02 (2006.01)
F28F 1/04 (2006.01)
F28F 1/40 (2006.01)

(52) U.S. Cl.
CPC ............. *F28F 1/022* (2013.01); *F28F 1/045* (2013.01); *F28F 1/40* (2013.01)

(58) Field of Classification Search
CPC ............... F28F 1/40; F28F 1/045; F28F 1/022
USPC ...................................................... 165/109.1
See application file for complete search history.

(56) References Cited

U.S. PATENT DOCUMENTS

| | | | |
|---|---|---|---|
| 4,949,200 A | | 4/1990 | Glomski et al. |
| 5,733,451 A | * | 3/1998 | Coellner ............... F24F 3/1423 96/125 |
| 10,378,359 B2 | | 8/2019 | Golan et al. |
| 10,739,077 B2 | | 8/2020 | Gerstler et al. |
| 10,890,381 B2 | * | 1/2021 | Turney .................... F28D 7/082 |
| 11,022,373 B2 | * | 6/2021 | Henderson ............. F28F 1/022 |
| 11,226,158 B2 | * | 1/2022 | Streeter ............... F28F 9/0268 |
| 11,448,466 B2 | * | 9/2022 | Turney ...................... F28D 7/08 |
| 2009/0321045 A1 | | 12/2009 | Hernon et al. |
| 2017/0023311 A1 | * | 1/2017 | Urbanski ............. F28F 9/0268 |
| 2017/0146305 A1 | * | 5/2017 | Kuczek ................ F28F 9/0268 |
| 2017/0198978 A1 | * | 7/2017 | Kuczek ................ F28D 7/0016 |

(Continued)

FOREIGN PATENT DOCUMENTS

| | | |
|---|---|---|
| DE | 8904345 U1 | 5/1989 |
| EP | 0394718 A1 * | 4/1990 |

(Continued)

OTHER PUBLICATIONS

Extended European Search Report dated Apr. 7, 2022, received for corresponding European Application No. 21213353.2, pp. 6.

*Primary Examiner* — Jon T. Schermerhorn, Jr.
(74) *Attorney, Agent, or Firm* — Kinney & Lange, P.A.

(57) ABSTRACT

A heat exchanger core includes a first side, a second side, a third side, and a fourth side. A first layer includes a first width extending in a first direction, a first length extending in a second direction, a first height extending in a third direction, and a first plurality of passages, which extend from an inlet to an outlet. A second layer includes a second width extending in the first direction, a second length extending in the second direction, a second height extending in the third direction, and a second plurality of passages extending from the first side to the second side. The first and second plurality of passages are adjacent to one another. The first and second plurality of passages include a sinusoidal profile in the third direction and a sinusoidal profile in the first direction.

16 Claims, 9 Drawing Sheets

(56) References Cited

U.S. PATENT DOCUMENTS

| | | | |
|---|---|---|---|
| 2017/0198979 A1 | 7/2017 | St. Rock et al. | |
| 2017/0205146 A1* | 7/2017 | Turney | F28D 7/0033 |
| 2018/0238627 A1* | 8/2018 | Herring | F28F 13/08 |
| 2018/0345425 A1* | 12/2018 | Caimano | B22F 5/106 |
| 2019/0285364 A1* | 9/2019 | Streeter | F28F 9/0268 |
| 2020/0182560 A1* | 6/2020 | Bhosale | F25B 39/04 |
| 2020/0217591 A1 | 7/2020 | Henderson et al. | |
| 2020/0309459 A1 | 10/2020 | Streeter | |
| 2021/0372706 A1* | 12/2021 | Turney | F28F 1/04 |

FOREIGN PATENT DOCUMENTS

| | | | | |
|---|---|---|---|---|
| EP | 3193125 A1 * | 7/2017 | | B23P 15/26 |
| EP | 3193125 A1 | 7/2017 | | |
| EP | 3660434 A1 * | 6/2020 | | F28D 9/0025 |
| EP | 3660434 A1 | 6/2020 | | |
| EP | 3742098 A1 * | 11/2020 | | F28D 7/005 |
| EP | 3742098 A1 | 11/2020 | | |
| KR | 20170089594 A * | 1/2017 | | |
| KR | 101992482 B1 | 8/2017 | | |

\* cited by examiner

MULTI-SCALE HEAT EXCHANGER CORE

BACKGROUND

The present disclosure relates to heat exchangers, and in particular to heat exchanger cores.

Heat exchangers are often used to transfer heat between two fluids. For example, on aircraft, heat exchangers are used to transfer heat between a relatively hot air source, e.g., bleed air from a gas turbine engine, and a relatively cool air source, e.g., ram air. Heat exchangers built for aircraft must be compact yet provide enough heat transfer surface area for adequate heat transfer. Maximizing the heat transfer surface area increases the effectiveness of the heat exchanger.

SUMMARY

In one example, a heat exchanger core including a first side, a second side, opposite the first side, a third side, and a fourth side, opposite third side. The third and fourth side extend from the first side to the second side. A first layer includes a first width extending in a first direction, a first length extending in a second direction, a first height extending in a third direction, and a first plurality of passages. Each passage of the first plurality of passages includes an inlet on the first side and an outlet on the second side and extends from the inlets to the outlets. Each passage of the first plurality of passages includes a hexagonal profile. A second layer includes a second width extending in the first direction, a second length extending in the second direction, a second height extending in the third direction, and a second plurality of passages extending from the first side to the second side. Each passage of the second plurality of passages includes a hexagonal profile. The first and second plurality of passages are adjacent to one another. The first and second plurality of passages include a sinusoidal profile in the third direction, and the first and second plurality of passages include a sinusoidal profile in the first direction.

In another example, a heat exchanger core includes a first side, a second side opposite the first side, a third side, and a fourth side opposite the third side. The third and fourth sides each extend from the first side to the second side. A first layer includes a first width extending in a first direction, a first length extending in a second direction, a first height extending in a third direction, and a first plurality of passages. Each passage of the first plurality of passages includes an inlet on the first side and an outlet on the second side. Each passage of the first plurality of passages extends from the inlet to the outlet and includes a hexagonal cross-sectional profile. A second layer includes a second width extending in the first direction, a second length extending in the second direction, and a second height extending in the third direction, and a second plurality of passages extending from the first side to the second side. Each passage of the second plurality of passages comprises a hexagonal cross-sectional profile. The first and second plurality of passages are adjacent to one another. The first and second plurality of passages each comprise a first profile in the third direction defined by:

$$y_1 = y_{0_1} + A_y \sin\left(2\pi \frac{z_1}{d_{z,y}}\right);$$

where $y_1$ is the first profile in the third direction, $y_{0_1}$ is a first origination point, $A_y$ is a first amplitude, $z_1$ is a position in the second direction, and $d_{z,y}$ is a first wavelength. The first and second plurality of passages each comprise a second profile in the first direction defined by:

$$x_1 = x_0 + A_x \sin\left(2\pi \frac{z_1}{d_{z,x}}\right)$$

where $x_1$ is the second profile in the first direction, $x_0$ is a second origination point, $A_x$ is a second amplitude, $z_1$ is a position in the second direction, and $d_{z,x}$ is a second wavelength.

In another example, a heat exchanger core includes a first layer including a first width extending in a first direction, a first length extending in a second direction, and a first height extending in a third direction. A first plurality of passages extending in the second direction. Each passage of the first plurality of passages includes an inlet opposite an outlet. Each passage of the plurality of passages extends from the inlet to the outlet. A second layer includes a second width extending in the first direction, a second length extending in the second direction, and a second height extending in the third direction, and a second plurality of passages extending in the second direction. The first and second plurality of passages are adjacent to one another. The first and second plurality of passages comprise a first sinusoidal profile in the third direction and a second sinusoidal profile in the first direction.

Figure 1A:
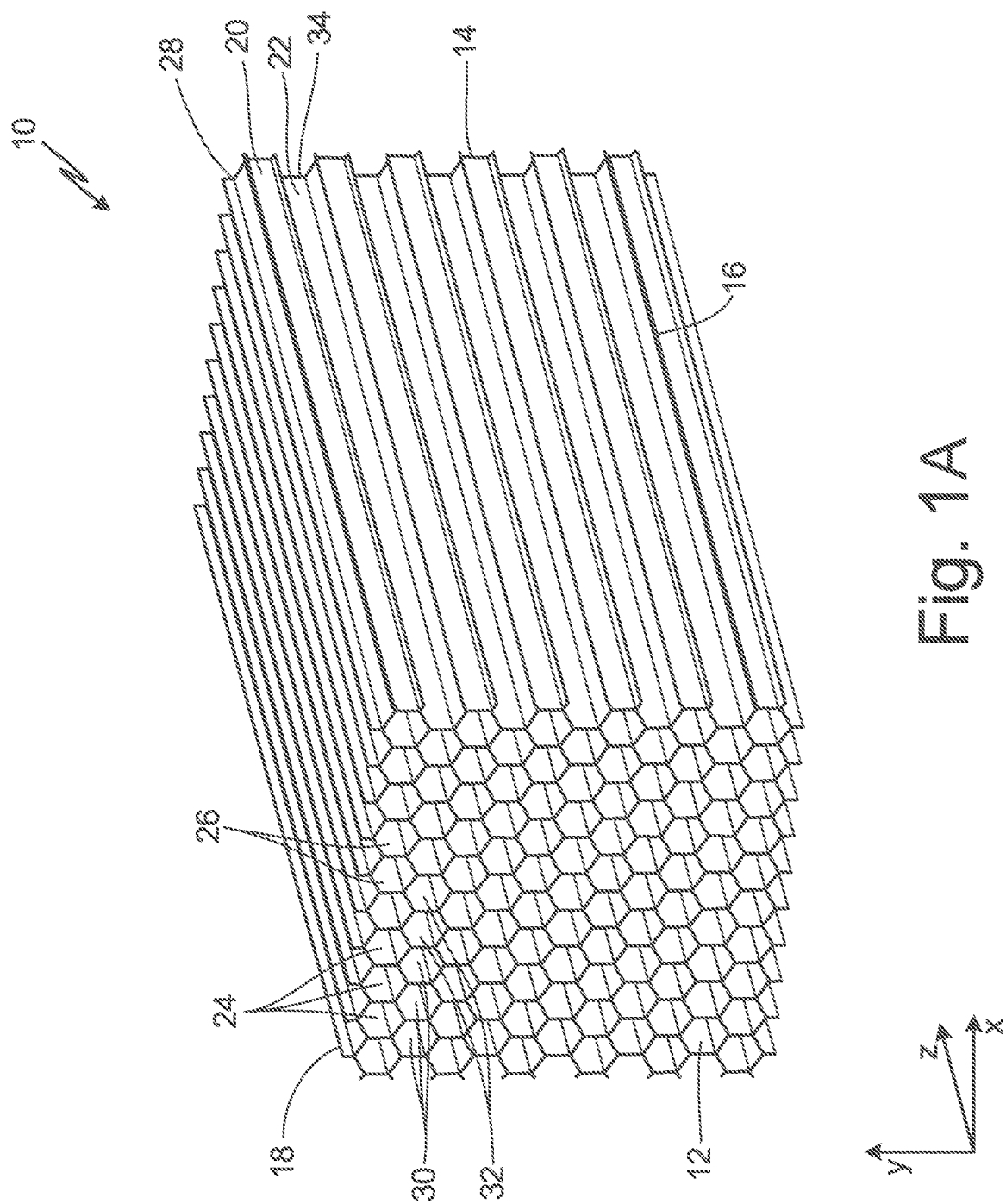
FIG. 1A is a perspective view of a heat exchanger core with hexagonal passages.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

The present disclosure relates to a heat exchanger core. The heat exchanger core includes at least a first layer and a second layer. Both the first and second layers include a plurality of passages, which are hexagonal in shape and extend lengthwise through the heat exchanger core from a first side to a second side. The hexagonal shape of the plurality of passages increases the surface area between the first and second layers. The increased surface area between the first and second layers increases the heat transfer therebetween. The plurality of passages of the first and second layers each include a first sinusoidal profile with an amplitude in a widthwise direction of the core and a second sinusoidal profile with an amplitude in a height-wise direction of the core. The first and second sinusoidal profiles increase the surface area between the first and second layers. The increased surface area between the first and second layers increases the heat transfer therebetween. The heat exchanger core will be discussed with reference to FIGS. 1A-4C.

Figure 1B:
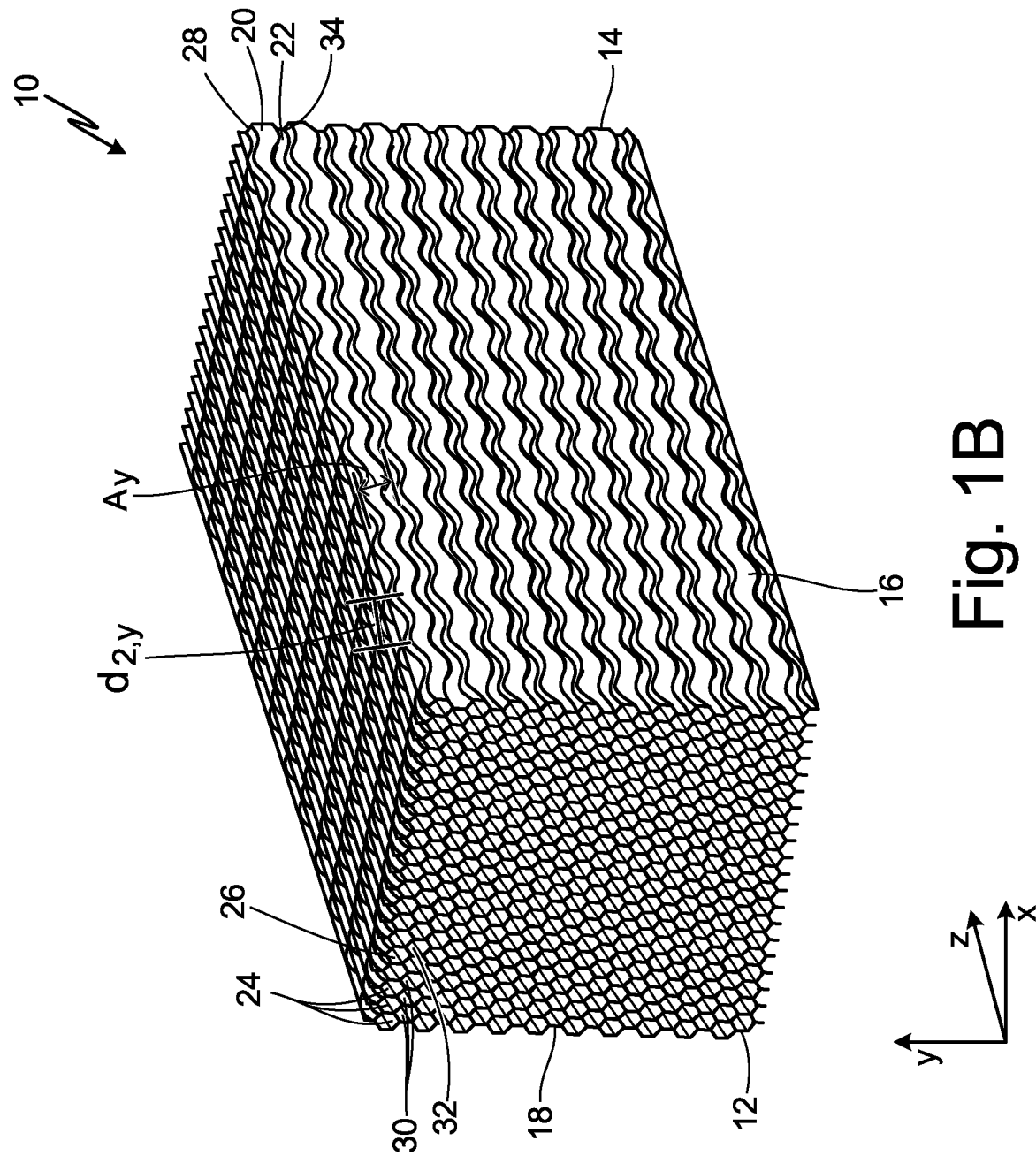
FIG. 1B is a perspective view of the heat exchanger core with hexagonal passages that include a sinusoidal profile in a third direction.
Figure 1C:
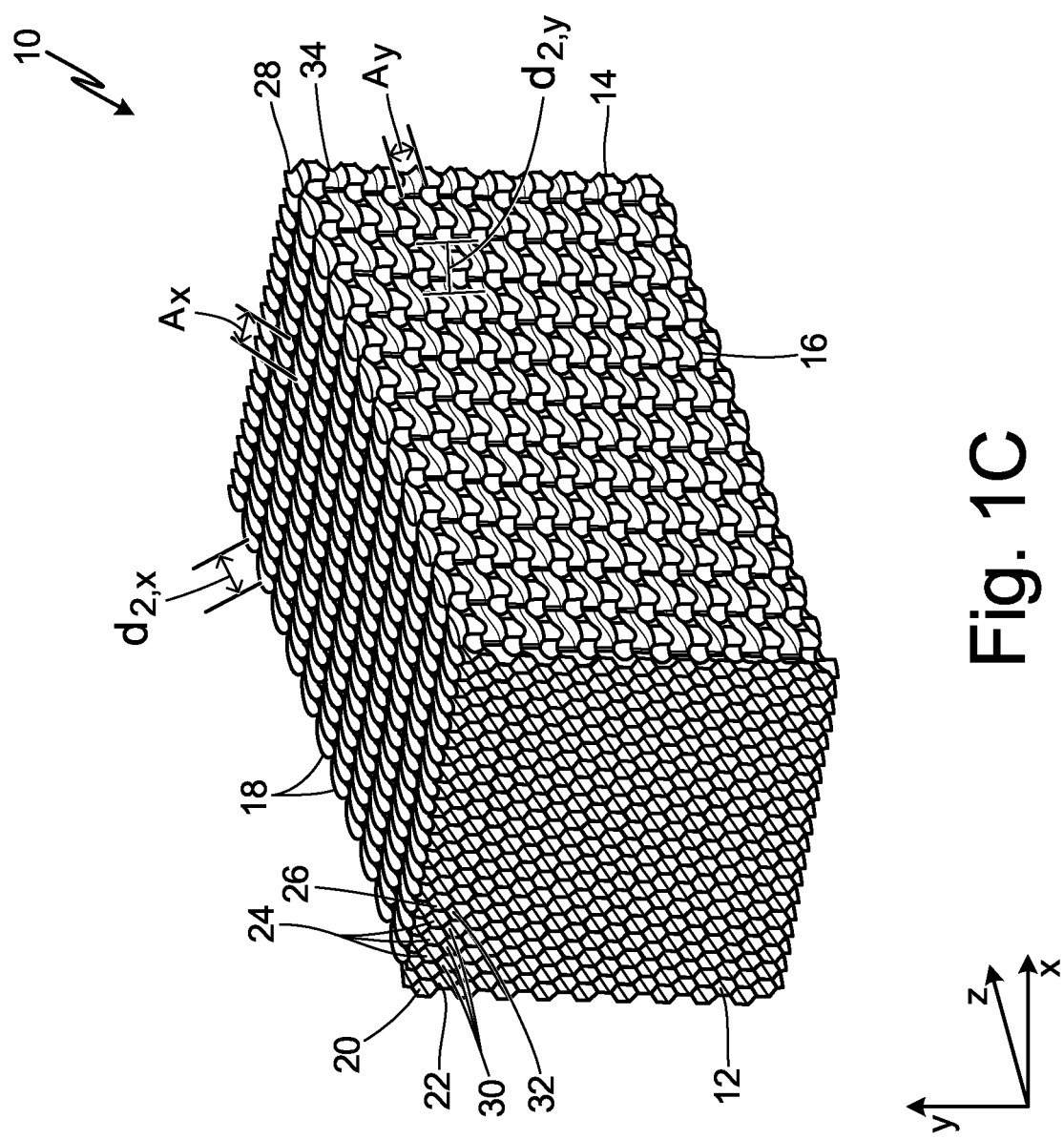
FIG. 1C is a perspective view of the heat exchanger core with hexagonal passages that include the sinusoidal profile in the third direction and a sinusoidal profile in a first direction.

FIGS. 1A-1C will be discussed concurrently. FIG. 1A is a perspective view of heat exchanger core 10 with hexagonal passages. FIG. 1B is a perspective view of heat exchanger 10 with hexagonal passages that include a sinusoidal profile in third direction Y. FIG. 1C is a perspective view of heat exchanger core 10 with hexagonal passages that include the sinusoidal profile in third direction Y and a sinusoidal profile in first direction X. Heat exchanger 10 includes first side 12, second side 14, third side 16, fourth side 18, first layer 20, second layer 22, first direction X, second direction Z, and third direction Y. First layer 20 includes first plurality of passages 24. Each passage 24 includes inlet 26 and outlet 28. Second layer 22 includes second plurality of passages 30. Each passage 30 includes inlet 32 and outlet 34.

First side 12 of heat exchanger core 10 is opposite second side 14. Third side 16 is opposite fourth side 18 and third side 16 and fourth side 18 extend from first side 12 to second side 14. First layer 20 has a width extending in first direction X, a length extending in second direction Z, and a height extending in third direction Y. Each of passages 24 extends in second direction Z from inlet 26 to outlet 28. First layer 20 is adjacent second layer 22. Second layer 22 has a width extending in first direction X, a length extending in second direction Z, and a height extending in third direction Y. Each of passages 30 extends in second direction Z from inlet 32 to outlet 34.

In one example, first layer 20 can direct a hot fluid, e.g., bleed air from a gas turbine engine, through passages 24 from inlets 26 to outlets 28. Second layer 22 can direct a cold fluid, e.g., ram air, through passages 30 from inlets 32 to outlets 34. In another example, first layer 20 can direct a cold fluid, e.g., ram air, through passages 24. Second layer 22 can direct a hot fluid, e.g., bleed air from a gas turbine engine, through passages 30.

In one example, layers (20 and 22) can have inlets 32 on first side 12 and outlets 34 on second side 14. In another example, first layer 20 can have inlet 32 on first side 12 and outlet 34 on second side 14 and second layer 22 can have inlet 32 on second side 14 and outlet 34 on first side 12. In another example, first layer 20 can have inlet 32 on second side 14, and outlet 34 on first side 12 and second layer 22 can have inlet 32 on first side 12 and outlet 34 on second side 14.

In the example shown in FIGS. 1A-1C each passage of passages (24 and 30) is hexagonally shaped with a hexagonal cross-sectional profile in the X-Y plane. The hexagonal shape of each passage of passages (24 and 30) increases the heat transfer between first and second layers (20 and 22) by increasing the surface area therebetween. In another example, the shape of each passage of passages (24 and 30) can be altered to increase the surface area between passages (24 and 30), which increases the heat transfer between first layer 20 and second layer 22.

As shown in FIG. 1B, passages (24 and 30) can each include a first sinusoidal profile in third direction Y extending from first side 12 to second side 14. The first sinusoidal profile in third direction Y is defined by:

$$y_1 = y_{0_1} + A_y \sin\left(2\pi \frac{z_1}{d_{z,y}}\right)$$

Profile $y_1$ is the first sinusoidal profile that defines passages (24 and 30) in third direction Y. Origination point $y_{0_1}$ is an origination point for profile $y_1$. Amplitude $A_y$ is an amplitude for profile $y_1$ that extends in height in third direction Y. Amplitude $A_y$ can be adjusted to influence the heat transfer between first and second layers (20 and 22). For instance, increasing amplitude $A_y$ increases the surface area between passages (24 and 30) by increasing a flow length of each of passages (24 and 30) between first side 12 and second side 14. The increased surface area between passages (24 and 30) increases the heat transfer between first and second layers (20 and 22). Decreasing amplitude $A_y$ in third direction Y decreases the surface area between passages (24 and 30) by decreasing the flow length of passages (24 and 30) between first side 12 and second side 14. The decreased surface area between passages (24 and 30) decreases the heat transfer between first and second layers (20 and 22). Position $z_1$ is a position along profile $y_1$ in second direction Z. Wavelength $d_{z,y}$ is the wavelength of profile $y_1$ in second direction Z. Wavelength $d_{z,y}$ can also be adjusted to influence the heat transfer between first and second layers (20 and 22). For instance, decreasing wavelength $d_{z,y}$ increases the frequency of profile $y_1$. Increasing the frequency of profile $y_1$ increases the flow length of passages (24 and 30) between first side 12 and second side 14. Increasing the flow length of passages (24 and 30) between first side 12 and second side 14 increases the surface area between passages (24 and 30). The increased surface area between passages (24 and 30) increases the heat transfer between first and second layers (20 and 22). Increasing wavelength $d_{z,y}$ decreases the frequency of profile $y_1$. Decreasing the frequency of profile $y_1$ decreases the flow length of passages (24 and 30) between first side 12 and second side 14. Decreasing the flow length of passages (24 and 30) between first side 12 and second side 14 decreases the surface area between passages (24 and 30). The decreased surface area between passages (24 and 30) decreases the heat transfer between first and second layers (20 and 22).

FIG. 1C discloses another embodiment of heat exchanger core 10. As shown in FIG. 1C, each of passages (24 and 30) includes the first sinusoidal profile in third direction Y described above with reference to FIG. 1B and characterized by the equation for profile $y_1$. Each of passages (24 and 30) of heat exchanger core 10 in FIG. 1C also includes a second sinusoidal profile in first direction X extending from first side 12 in second direction Z to second side 14. The second sinusoidal profile in first direction X of passages (24 and 30) can be defined by:

$$x_1 = x_0 + A_x \sin\left(2\pi \frac{z_1}{d_{z,x}}\right)$$

Profile $x_1$ is the second sinusoidal profile that defines passages (24 and 30) in first direction X. Origination point $x_0$ is an origination point for profile $x_1$. Amplitude $A_x$ is an amplitude for profile $x_1$ that extends in first direction X. Amplitude $A_x$ can be adjusted to influence the heat transfer between first and second layers (20 and 22). For instance, increasing amplitude $A_x$ increases the surface area between passages (24 and 30) by increasing a flow length of each of passages (24 and 30) between first side 12 and second side 14. The increased surface area between passages (24 and 30) increases the heat transfer between first and second layers (20 and 22). Decreasing amplitude $A_x$ decreases the surface area between passages (24 and 30) by decreasing the flow length of each of passages (24 and 30) between first side 12 and second side 14. The decreased surface area between passages (24 and 30) decreases the heat transfer between first and second layers (20 and 22). Position $z_1$ is a position along profile $x_1$ in second direction Z. Wavelength $d_{z,x}$ is the wavelength of profile $x_1$ in second direction Z. Wavelength $d_{z,x}$ can also be adjusted to influence the heat transfer between first and second layers (20 and 22). For instance, decreasing wavelength $d_{z,y}$ increases the frequency of profile $x_1$. Increasing the frequency of profile $x_1$ increases the flow length of passages (24 and 30) between first side 12 and second side 14. Increasing the flow length of passages (24 and 30) between first side 12 and second side 14 increases the surface area between passages (24 and 30). The increased surface area between passages (24 and 30) increases the heat transfer between first and second layers (20 and 22). Increasing wavelength $d_{z,x}$ decreases the frequency of profile $x_1$. Decreasing the frequency of profile $x_1$ decreases the flow length of passages (24 and 30) between first side 12 and second side 14. Decreasing the flow length of passages (24 and 30) between first side 12 and second side 14 decreases the surface area between passages (24 and 30). The decreased surface area between passages (24 and 30) decreases the heat transfer between first and second layers (20 and 22).

In the example shown in FIG. 1C, amplitude $A_y$ of profile $y_1$ and amplitude $A_x$ of profile $x_1$ can have the same magnitude in their respective directions Y and X. In another example, amplitude $A_y$ of profile $y_1$ and amplitude $A_x$ of profile $x_1$ can have different magnitudes in their respective directions Y and X. The magnitudes of amplitude $A_y$ of profile $y_1$ and amplitude $A_x$ of profile $x_1$ can be controlled and adjusted during a design process of heat exchanger core 10 to tailor heat exchanger core 10 toward a desired performance level. In the example shown in FIG. 1C, wavelength $d_{z,y}$ of profile $y_1$ and wavelength $d_{z,x}$ of profile $x_1$ are equal in length. In another example, wavelength $d_{z,y}$ of profile $y_1$ and wavelength $d_{z,x}$ of profile $x_1$ can be different in length. The values of wavelength $d_{z,y}$ of profile $y_1$ and wavelength $d_{z,x}$ of profile $x_1$ can also be controlled and adjusted during the design process of heat exchanger core 10 to tailor heat exchanger core 10 toward a desired performance level.

Figure 2A:
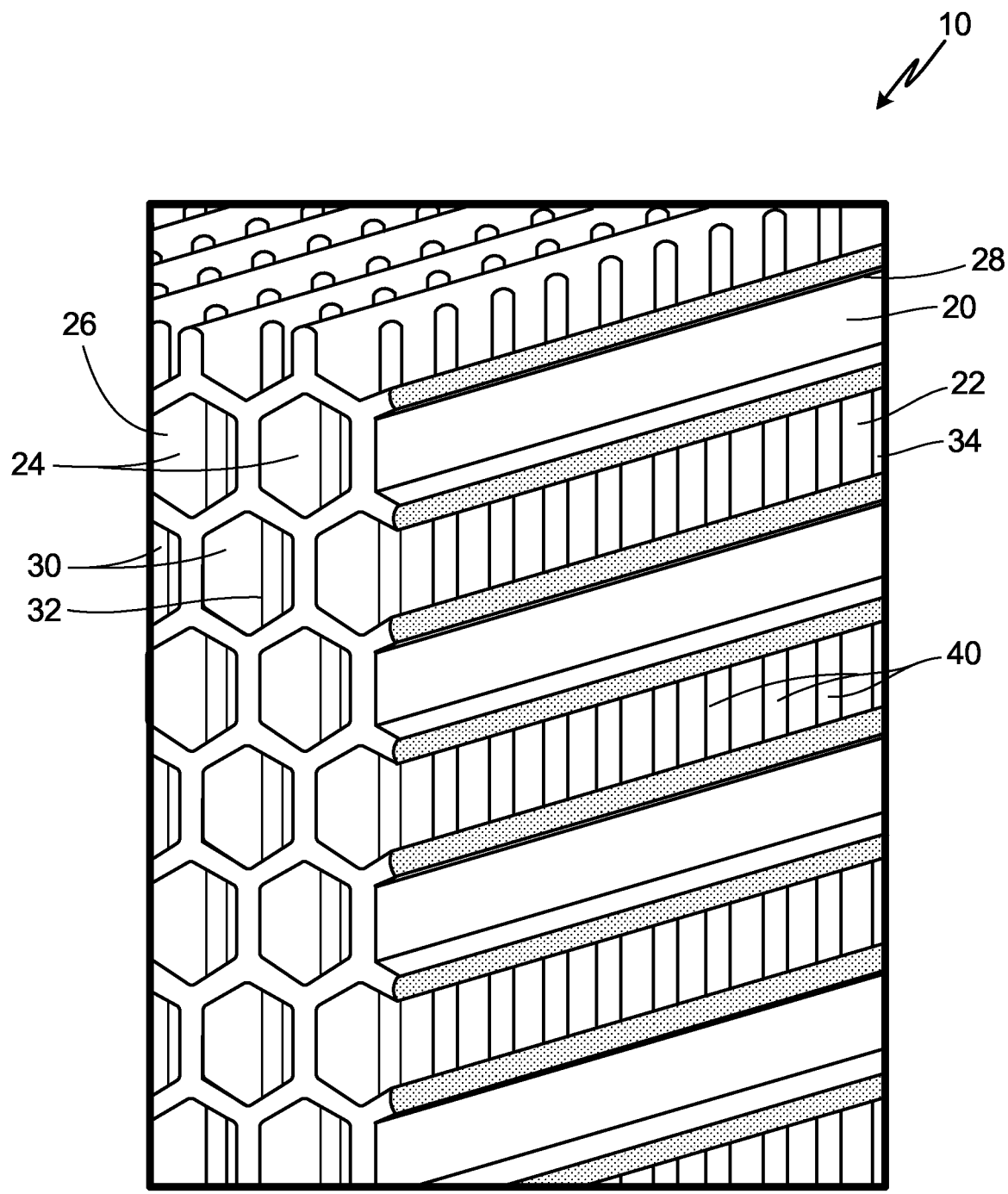
FIG. 2A is a perspective cross-sectional view of a heat exchanger core with a plurality of hexagonal passages containing a plurality of columns.
Figure 2A:
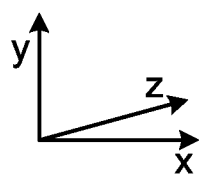
Figure 2B:
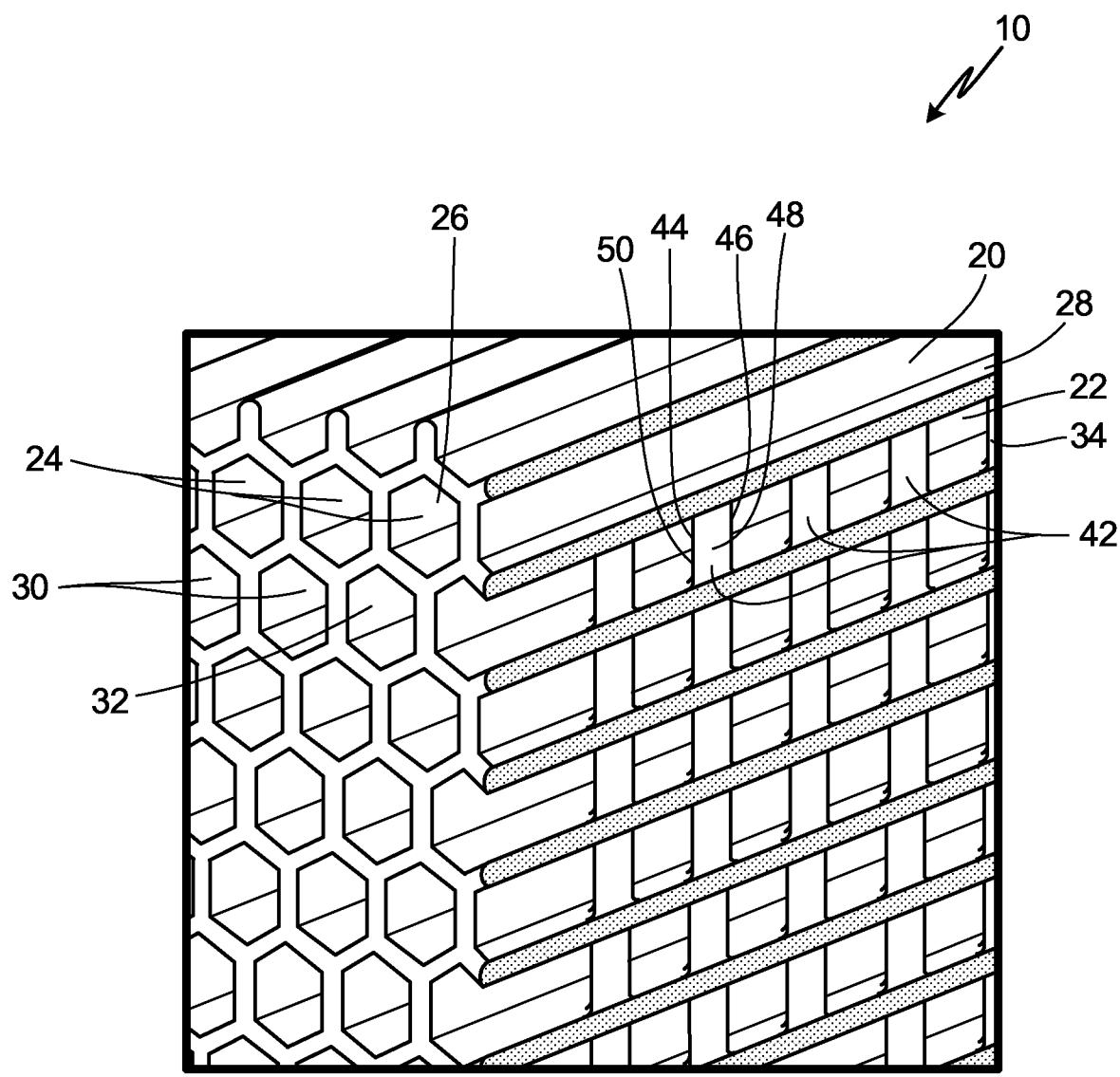
FIG. 2B is a perspective cross-sectional view of a heat exchanger core with a plurality of hexagonal passages containing a plurality of fin-shaped columns.
Figure 2B:
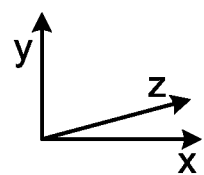

FIGS. 2A and 2B will be discussed concurrently. FIG. 2A is a perspective cross-sectional view of heat exchanger core 10 with a plurality of columns 40. FIG. 2B is a perspective cross-sectional view of heat exchanger core 10 with a plurality of fin-shaped columns 42 (hereinafter referred to as "fins 42"). Columns 40 include a diameter. Fins 42 include leading edge 44, trailing edge 46, first surface 48, second surface 50, a thickness, and a width.

Columns 40 and fins 42 are within passages (24 and 30). Columns 40 and fins 42 increase the surface area of first and second plurality of passages (24 and 30), which improves the heat transfer between first and second layers (20 and 22). Each of columns 40 and fins 42 generates turbulent flow within passages (24 and 30). When turbulent flow occurs within passages (24 and 30) there is improved heat transfer between first and second layers (20 and 22).

The diameter of columns 40 influences the heat transfer between first and second layers (20 and 22). For instance, increasing the diameter increases the surface area of passages (24 and 30) and increases the resistance to flow through passages (24 and 30). Therefore, there is more heat transfer between first and second layers (20 and 22). Decreasing the diameter decreases the surface area of first and second plurality of passages (24 and 30). Additionally, decreasing the diameter decreases the resistance of flow through passages (24 and 30). Therefore, there is less heat transfer between first and second layers (20 and 22). The size of the diameter can also be controlled and adjusted during the design process of heat exchanger core 10 to tailor heat exchanger core 10 toward a desired performance level.

Increasing the number of columns 40 increases the surface area of passages (24 and 30). In contrast, decreasing the number of columns 40 decreases the surface area of passages (24 and 30). In the example of FIG. 2A, columns 40 are cylinders. In another example, columns 40 can be a triangular prism, rectangular prisms, cones, pyramids, or any other three-dimensional shape used to interrupt flow within an air passage.

Referring to FIG. 2B, leading edge 44 of each fin 42 is an upstream edge of fin 42 in second direction Z. Trailing edge 46 of each fin 42 is a downstream edge of fin 42 in the second direction Z. First surface 48 extends from leading edge 44 to trailing edge 46. Second surface 50 is opposite first surface 48 and extends from leading edge 44 to trailing edge 46. The thickness of fins 42 is the distance from first surface 48 to second surface 50. The width of fins 42 is the distance between leading edge 44 and trailing edge 46 extending in second direction Z. Fins 42 are spaced from one another in passages (24 and 30) in second direction Z.

Fins 42 influence the heat transfer between first and second layers (20 and 22). For instance, the thickness, the width, or the number of fins 42 increases the surface area of fins 42 and thereby increases the surface area of passages (24 and 30). Decreasing the thickness, the width, or the number of fins 42 decreases the surface area of fins 42 and thereby decreases the surface area of passages (24 and 30). As discussed above, increasing or decreasing the surface area of passages (24 and 30) increases or decreases the heat transfer between first and second layers (20 and 22), respectively. In other examples, heat exchanger 10 can include a mixture of columns 40 and fins 42.

Figure 3:
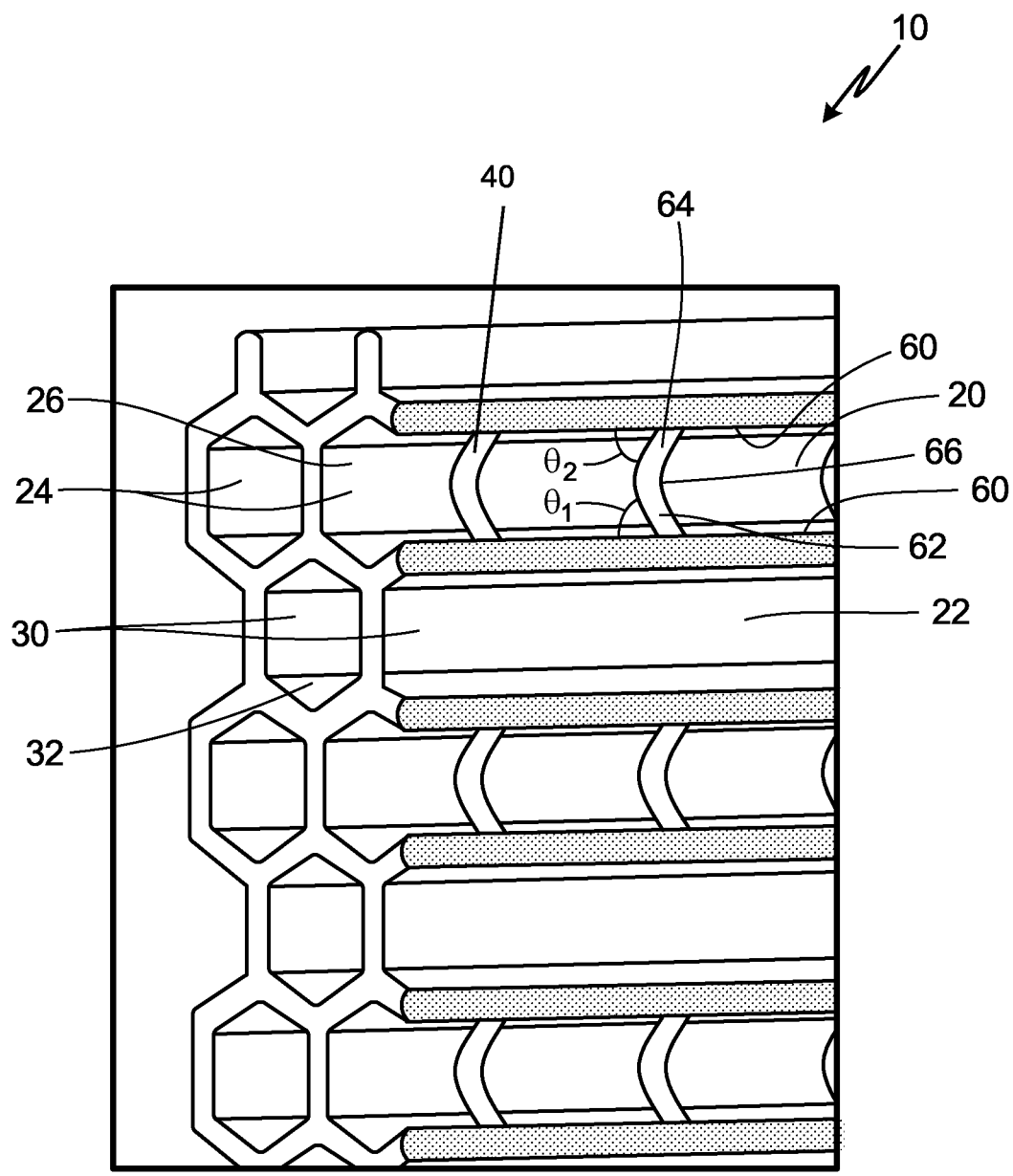
FIG. 3 is a perspective cross-sectional view of a heat exchanger core with a plurality of hexagonal passages containing a plurality of bent columns.

FIG. 3 is a perspective view of another example of heat exchanger core 10. As shown in FIG. 3, each of passages 24 includes wall 60 and columns 40. Each of columns 40 includes first portion 62, second portion 64, bend 66, first angle $\theta_1$, and second angle $\theta_2$. Wall 60 defines the interior of passage 24. First portion 62 extends from wall 60 at first angle $\theta_1$. Second portion 64 extends from wall 60 at second angle $\theta_2$. First portion 62 and second portion 64 come together at bend 66. First angle $\theta_1$ ranges from 5 degrees to 55 degrees. Second angle $\theta_2$ ranges from 5 degrees to 55 degrees. First angle $\theta_1$ and second angle $\theta_2$ enable column 40 to be additively manufactured without requiring additional support structure. Additionally, first angle $\theta_1$ and second angle $\theta_2$ increase the surface area of columns 40 within passages 24 by increasing the overall lengths of columns 40.

In the example of FIG. 3, bend 66 can be an arch determined by the following relationship:

$$z_{arch} = z_0 + A_{arch}\sin^2\left(2\pi\frac{y}{d_{arch}}\right)$$

Profile $z_{arch}$ is a profile used to shape columns 40 in second direction Z. Origination point $z_0$ is a starting position for profile $z_{arch}$ in second direction Z. Amplitude $A_{arch}$ is the amplitude of profile $z_{arch}$ in second direction Z. Position y is a position in third direction Y. Wavelength $d_{arch}$ is the wavelength for profile $z_{arch}$ in third direction Y. Amplitude $A_{arch}$ influences first and second angles ($\theta_1$ and $\theta_2$) and bend 66. Increasing amplitude $A_{arch}$ decreases first and second angles ($\theta_1$ and $\theta_2$). Decreasing amplitude $A_{arch}$ increases first and second angles ($\theta_1$ and $\theta_2$). Amplitude $A_{arch}$ can be defined as a function of channel alignment with a build direction for additively manufacturing heat exchanger core 10 in the following field function:

$$A_{arch} = A_{arch}^{max}(\vec{c} \cdot \vec{b})$$

When the channel alignment $\vec{c}$ of passages 24 is aligned with the build direction $\vec{b}$ of heat exchanger core 10 in second direction Z, amplitude $A_{arch}$ will have a large value so as to impart a large amount of bending/arching in columns 40 such that columns 40 are self-supporting during additive manufacturing. When the build direction $\vec{b}$ is in third direction Y and perpendicular to channel alignment $\vec{c}$ of passages 24, $A_{arch}$ will have a small value such that columns 40 are built straight or nearly straight during additive manufacturing. By using the field function, amplitude $A_{arch}$ adjusts the design of columns 40 to respond to manufacturing decisions when building heat exchanger core 10. While the example of FIG. 3 shows columns 40 in passages 24, columns 40 can also be included in passages 30.

Each of the examples discussed above with reference to FIGS. 1A-3 show heat exchanger core 10 having a macro-scale shape of a rectangular prism. The macro-scale shape, also called the macro-scale form factor, is the overall shape of heat exchanger core 10. The macro-scale form factor of heat exchanger core 10 can be adjusted to adjust the heat exchanger capabilities of heat exchanger core 10 and to fit heat exchanger core 10 within a curved space. Heat exchanger core 10 with macro-scale adjustments will be discussed with reference to FIGS. 4A-4C.

Figure 4A:
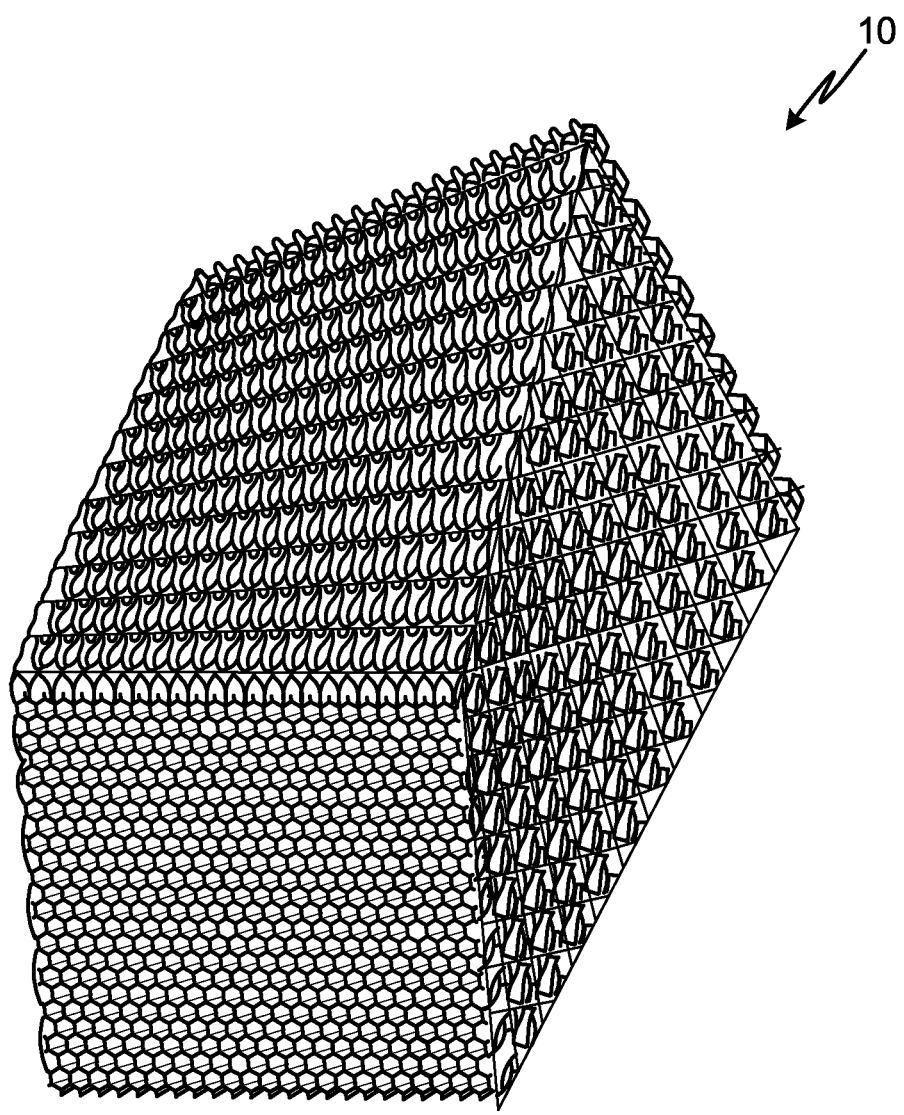
FIG. 4A is a perspective view of a heat exchanger core with a macro-scale twist.
Figure 4A:
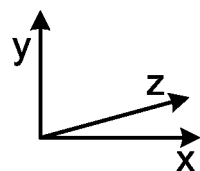

FIG. 4A is a perspective view of heat exchanger core 10 with a macro-scale twist. As shown in FIG. 4A, the macro-scale twist of heat exchanger core 10 twists heat exchanger core 10 about an axis parallel to second direction Z. The macro-scale twist increases the flow length of the passages in heat exchanger core 10, which thereby increases the surface area between layers of heat exchanger core 10. The increased surface area increases the heat transfer between the layers. Additionally, the macro-scale twist enables heat exchanger core 10 to fit and fill a twisted space, providing a more efficient use of space and more heat transfer capabilities when heat exchanger core 10 needs to fill a twisted space.

Figure 4B:
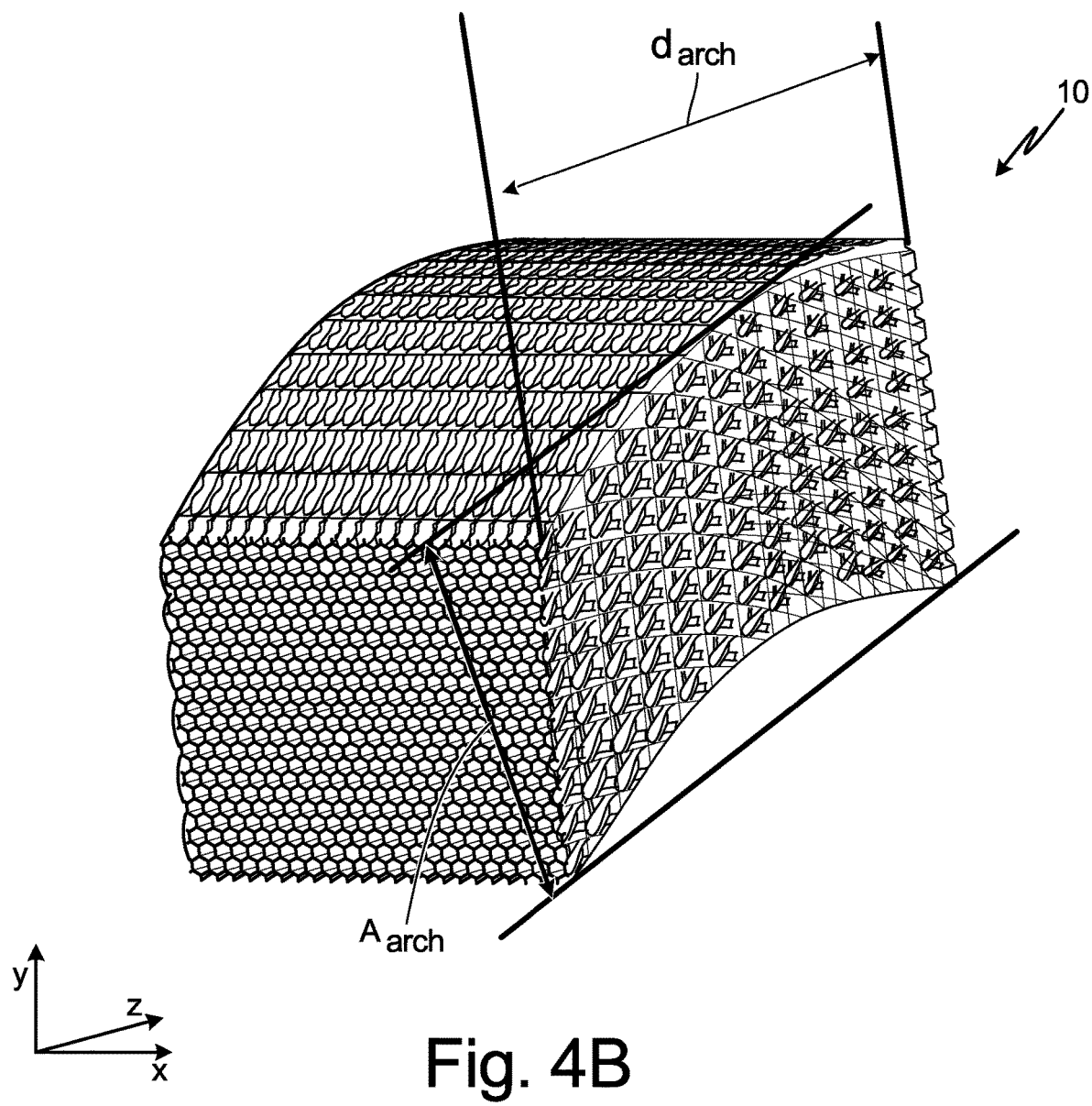
FIG. 4B is a perspective view of a heat exchanger core with a macro-scale arch.

FIG. 4B is a perspective view of heat exchanger core 10 with a macro-scale arch. As shown in FIG. 4B, heat exchanger core 10 can include a macro-scale arch. The macro-scale arch increases the surface area between the layers of heat exchanger core 10 by increasing the flow length of the passages in heat exchanger core 10. The increased surface area increases the heat transfer between the layers. Additionally, the macro-scale arch enables heat exchanger core 10 to fill a curved space, providing a more efficient use of space and more heat transfer capabilities when heat exchanger core 10 needs to fill a curved space. The macro-scale arch can be defined by the following sinusoidal macro-profile equation:

$$y_{arch} = y_{0_2} + A_{arch}\sin\left(2\pi\frac{z_2}{d_{arch}}\right);$$

Profile $y_{arch}$, is the macro-scale profile for heat exchanger core 10 in third direction Y. Origination point $y_{0_2}$ is the macro-scale form factor origination point for profile $y_{arch}$. Amplitude $A_{arch}$ is the amplitude of profile $y_{arch}$ in third direction Y. Position $z_2$ is a position in second direction Z. Wavelength $d_{arch}$ of profile $y_{arch}$ is a wavelength for the macro-scale form factor in second direction Z.

Amplitude $A_{arch}$ of profile $y_{arch}$ can be adjusted to influence heat exchanger core 10. For instance, increasing amplitude $A_{arch}$ of profile $y_{arch}$ increases the surface area of the passages in heat exchanger core 10 by increasing the flow length of the passages. The increased surface area between the passages increases the heat transfer between the layers of heat exchanger core 10. Decreasing amplitude $A_{arch}$ of profile $y_{arch}$ decreases the surface area between the passages by decreasing the flow length of the passages. The decreased surface area between the passages decreases the heat transfer between the layers of heat exchanger core 10. Amplitude $A_{arch}$ can also be adjusted to fit core 10 within a defined envelope. The defined envelope is the space of which core 10 must fit within. The defined envelope is a constraint within the system that includes core 10.

Wavelength $d_{arch}$ of profile $y_{arch}$ also can be adjusted to influence heat exchanger core 10. For instance, increasing wavelength $d_{arch}$ of profile $y_{arch}$ increases the length of the layers of heat exchanger core 10. The increase in length of the layers increases the surface area between the passages. The increased surface area between the passages increases the heat transfer between the layers of heat exchanger core 10. In contrast, decreasing wavelength $d_{arch}$ of profile $y_{arch}$ decreases the length of the layers. The decrease in length of the layers decreases the surface area between the passages. The decreased surface area between the passages decreases the heat transfer between the layers. Thus, the values for the sinusoidal macro-profile equation of profile $y_{arch}$ can be adjusted and controlled to tailor the geometry of heat exchanger core 10 to achieve a desired performance level. Wavelength $d_{arch}$ can also be adjusted to fit core 10 within the defined envelope.

Figure 4C:
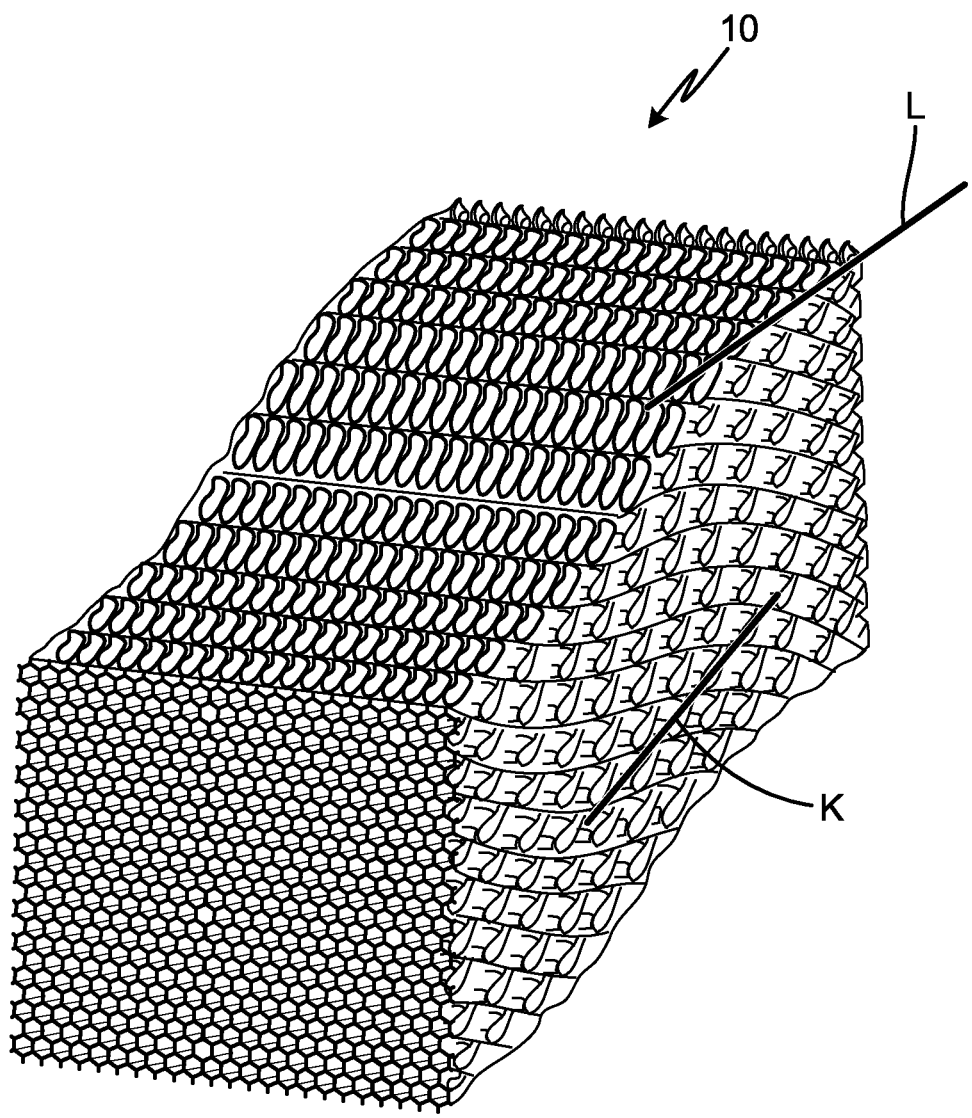
FIG. 4C is a perspective view of a heat exchanger core with a macro-scale logistic sigmoid curve.
Figure 4C:
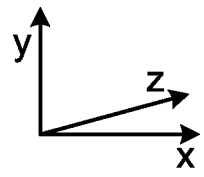

FIG. 4C is a perspective view of heat exchanger core 10 with a macro-scale form factor that is a logistic sigmoid curve (hereinafter referred to as the "macro-scale logistic sigmoid curve"). As shown in FIG. 4C, the macro-scale logistic sigmoid curve adjusts the overall height in third direction Y, length in second direction Z, and width in first direction X of heat exchanger core 10 in comparison to the embodiment of FIG. 1C. The macro-scale logistic sigmoid curve can be defined by:

$$y = y_{0_3} + \frac{L}{1 + e^{-k(z_4 - z_{mid})}}$$

Profile y represents the macro-scale logistic sigmoid curve in third direction Y. Origination point $y_{0_3}$ is the macro-scale form factor origination point. Position $z_4$ is a position in second direction Z. Value $z_{mid}$ is a z-value correlating to a midpoint of profile y. Maximum value L is the maximum value in third direction Y of a curve following the profile y. Steepness k is a steepness of the curve following the profile y.

Maximum value L can influence heat exchanger core 10. For instance, increasing maximum value L increases the overall height of heat exchanger core 10 in third direction Y, which increases the surface area between the passages of heat exchanger core 10. The increased surface area between the passages increases the heat transfer between the layers of heat exchanger core 10. Conversely, decreasing maximum value L decreases the overall height of heat exchanger core 10 in third direction Y, which decreases the surface area between the passages. The decreased surface area between the passages decreases the heat transfer between the layers of heat exchanger core 10.

Steepness k also influences heat exchanger core 10. Steepness k affects how quickly profile Y goes from a minimum value, to a maximum value. Increasing steepness k increases the rate of change between the minimum value and the maximum value. Increasing the rate of change between the minimum and maximum values would influence add an interruption to passages (24 and 30). The added interruption would increase pressure drop across core 10. In contrast, decreasing steepness k would have a more gradual rate of change between the minimum value and the maximum value. Decreasing the rate of change between the minimum value and the maximum value would decrease the interruption within passages (20 and 30). The decreased interruption would decrease pressure drop across core 10. Furthermore, steepness k can be changed to conform core 10 within the defined envelope.

In the examples of FIGS. 1A-4C, core 10 can be made from aluminum. In another example, core 10 can be made from stainless steel, steel, titanium, or any other material with a high thermal conductivity. Furthermore, in the examples of FIGS. 1A-4C, core 10 can be additively manufactured using a powder bed fusion additive manufacturing machine. In another example, core 10 can be additively manufactured using any other kind of additive manufacturing machine.

Discussion of Possible Embodiments

The following are non-exclusive descriptions of possible embodiments of the present invention.

In one example, a heat exchanger core including a first side, a second side, opposite the first side, a third side, and a fourth side, opposite third side. The third and fourth side extend from the first side to the second side. A first layer includes a first width extending in a first direction, a first length extending in a second direction, a first height extending in a third direction, and a first plurality of passages. Each passage of the first plurality of passages includes an inlet on the first side and an outlet on the second side and extends from the inlets to the outlets. Each passage of the first plurality of passages includes a hexagonal profile. A second layer includes a second width extending in the first direction, a second length extending in the second direction, a second height extending in the third direction, and a second plurality of passages extending from the first side to the second side. Each passage of the second plurality of passages includes a hexagonal profile. The first and second plurality of passages are adjacent to one another. The first and second plurality of passages include a sinusoidal profile in the third direction, and the first and second plurality of passages include a sinusoidal profile in the first direction.

The heat exchanger core of the preceding paragraph can optionally include, additionally and/or alternatively, any one or more of the following features, configurations and/or additional components:

wherein the sinusoidal profile in the third direction comprises a first amplitude;

wherein the sinusoidal profile in the first direction comprises a second amplitude wherein the first amplitude comprises a magnitude that is different from a magnitude of the second amplitude;

further comprising a plurality of columns inside at least one passage of the first plurality of passages or at least one passage of the second plurality of passages, wherein the plurality of columns are spread apart from one another in the second direction, and each column of the plurality of columns extends in the third direction;

wherein at least one column of the plurality of columns comprises a bend in the at least one column between a first portion of the at least one column and a second portion of the at least one column, wherein the first portion extends from a wall of the first or second plurality of passages at a first angle, and wherein the second portion extends from the wall of the first or second plurality of passages at a second angle;

wherein the first angle is between 5 degrees and 55 degrees, and wherein the second angle is between 5 degrees and 55 degrees;

wherein at least one column of the plurality of columns is a fin, wherein the fin extends from a leading edge to a trailing edge in the second direction;

wherein the heat exchanger core further comprises a macro-scale form factor comprising a sinusoidal macro-profile; and/or wherein the sinusoidal macro-profile comprises an amplitude in the third direction;

wherein the heat exchanger core further comprises a macro-scale form factor comprising a logistic sigmoid curve.

In another example, a heat exchanger core includes a first side, a second side opposite the first side, a third side, and a fourth side opposite the third side. The third and fourth sides each extend from the first side to the second side. A first layer includes a first width extending in a first direction, a first length extending in a second direction, a first height extending in a third direction, and a first plurality of passages. Each passage of the first plurality of passages includes an inlet on the first side and an outlet on the second side. Each passage of the first plurality of passages extends from the inlet to the outlet and includes a hexagonal cross-sectional profile. A second layer includes a second width extending in the first direction, a second length extending in the second direction, and a second height extending in the third direction, and a second plurality of passages extending from the first side to the second side. Each passage of the second plurality of passages comprises a hexagonal cross-sectional profile. The first and second plurality of passages are adjacent to one another. The first and second plurality of passages each comprise a first profile in the third direction defined by:

$$y_1 = y_{0_1} + A_y \sin\left(2\pi \frac{z_1}{d_{z,y}}\right);$$

where $y_1$ is the first profile in the third direction, $y_{0_1}$ is a first origination point, $A_y$ is a first amplitude, $z_1$ is a position in the second direction, and $d_{z,y}$ is a first wavelength. The first and second plurality of passages each comprise a second profile in the first direction defined by:

$$x_1 = x_0 + A_x \sin\left(2\pi \frac{z_1}{d_{z,x}}\right)$$

where $x_1$ is the second profile in the first direction, $x_0$ is a second origination point, $A_x$ is a second amplitude, $z_1$ is a position in the second direction, and $d_{z,x}$ is a second wavelength.

The heat exchanger core of the preceding paragraph can optionally include, additionally and/or alternatively, any one or more of the following features, configurations and/or additional components:

wherein the first and second amplitude are not equal;

wherein the first and second wavelength are not equal;

further comprising a plurality of columns inside at least one passage of the first plurality of passages or at least one passage of the second plurality of passages, wherein the plurality of columns are spread apart from one another in the second direction, and each column of the plurality of columns extends in the third direction wherein at least one column of the plurality of columns comprises:

an arch defined by:

$$z_{arch} = z_0 + A_{arch} \sin^2\left(2\pi \frac{y}{d_{arch}}\right);$$

where $z_{arch}$ is a profile of the arch for the at least one column, $z_0$ is a starting position in the second direction, $A_{arch}$ is the amplitude, $y$ is a position in the third direction, and $d_{arch}$ is the wavelength;

further comprising a macro-scale form factor defined by:

$$y_{arch} = y_{0_2} + A_{arch} \sin\left(2\pi \frac{z_2}{d_{arch}}\right);$$

where $y_{arch}$ is the macro-scale form factor in the third direction, $y_{0_2}$ is a macro-scale form factor origination point, $A_{arch}$ is a macro-scale form factor amplitude, $z_2$ is a position in the second direction, and $d_{arch}$ is a macro-scale form factor wavelength; and/or further comprising a macro-scale form factor defined by:

$$y = y_{0_3} + \frac{L}{1 + e^{-k(z_4 - z_{mid})}};$$

where $y$ is the macro-scale form factor in the third direction, $y_{0_3}$ is a macro-scale form factor origination point, $z_4$ is a position in the second direction, $z_{mid}$ is a value in the second direction at the midpoint of y, L is a maximum value of a curve following the macro-scale form factor y, and k is a steepness of the curve following the macro-scale form factor y.

In another example, a heat exchanger core includes a first layer including a first width extending in a first direction, a first length extending in a second direction, and a first height extending in a third direction. A first plurality of passages extending in the second direction. Each passage of the first plurality of passages includes an inlet opposite an outlet. Each passage of the plurality of passages extends from the inlet to the outlet. A second layer includes a second width extending in the first direction, a second length extending in the second direction, and a second height extending in the third direction, and a second plurality of passages extending in the second direction. The first and second plurality of passages are adjacent to one another. The first and second plurality of passages comprise a first sinusoidal profile in the third direction and a second sinusoidal profile in the first direction.

The heat exchanger core of the preceding paragraph can optionally include, additionally and/or alternatively, any one or more of the following features, configurations and/or additional components:

wherein the first sinusoidal profile comprises a first amplitude extending in the third direction and the second sinusoidal profile comprises a second amplitude extending in the first direction.

While the invention has been described with reference to an exemplary embodiment(s), it will be understood by those skilled in the art that various changes may be made and equivalents may be substituted for elements thereof without departing from the scope of the invention. For example, while passages (24 and 30) have been described as having a hexagonal cross-sectional profile. In other embodiments, passages (24 and 30) can has any shape as a cross-sectional profile. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger core comprising:
   a first side;
   a second side, opposite the first side;
   a third side;
   a fourth side, opposite third side, wherein the third and fourth side extend from the first side to the second side;
   a first layer comprising:
     a first width extending in a first direction, a first length extending in a second direction, and a first height extending in a third direction; and
     a first plurality of passages, wherein each passage of the first plurality of passages comprises an inlet on the first side and an outlet on the second side, wherein each passage of the plurality of passages extends from the inlet to the outlet, and wherein each passage of the first plurality of passages comprises a hexagonal profile;
   a second layer comprising:
     a second width extending in the first direction, a second length extending in the second direction, and a second height extending in the third direction; and a second plurality of passages extending from the first side to the second side, wherein each passage of the second plurality of passages comprises a hexagonal profile;

wherein:

the first and second plurality of passages are adjacent to one another;

the first and second plurality of passages comprise a sinusoidal profile in the third direction; and the first and second plurality of passages comprise a sinusoidal profile in the first direction;

wherein at least one of the passages of the first plurality of passages and at least one of the passages of the second plurality of passages each have a plurality of columns located therein, the columns spaced apart from one another and extending along the length of their respective passages, and the columns extending across their respective passages.

2. The heat exchanger core of claim 1, wherein the sinusoidal profile in the third direction comprises a first amplitude.

3. The heat exchanger core of claim 2, wherein the sinusoidal profile in the first direction comprises a second amplitude.

4. The heat exchanger core of claim 3, wherein the first amplitude comprises a magnitude that is different from a magnitude of the second amplitude.

5. The heat exchanger core of claim 1, wherein at least one column of the plurality of columns comprises a bend in the at least one column between a first portion of the at least one column and a second portion of the at least one column, wherein the first portion extends from a wall of the first or second plurality of passages at a first angle, and wherein the second portion extends from the wall of the first or second plurality of passages at a second angle.

6. The heat exchanger core of claim 5, wherein the first angle is between 5 degrees and 55 degrees, and wherein the second angle is between 5 degrees and 55 degrees.

7. The heat exchanger core of claim 1, wherein at least one column of the plurality of columns is a fin, wherein the fin extends from a leading edge to a trailing edge in the second direction.

8. The heat exchanger core of claim 1, wherein the heat exchanger core further comprises a form factor comprising a sinusoidal profile.

9. The heat exchanger core of claim 8, wherein the sinusoidal profile comprises an amplitude in the third direction.

10. The heat exchanger core of claim 1, wherein the heat exchanger core further comprises a form factor comprising a logistic sigmoid curve.

11. A heat exchanger core comprising:
a first side;
a second side opposite the first side;
a third side;
a fourth side opposite the third side, wherein the third and fourth sides each extend from the first side to the second side;
a first layer comprising:
a first width extending in a first direction, a first length extending in a second direction, and a first height extending in a third direction;
a first plurality of passages, wherein each passage of the first plurality of passages comprises an inlet on the first side and an outlet on the second side, wherein each passage of the first plurality of passages extends from the inlet to the outlet, and wherein each passage of the first plurality of passages comprises a hexagonal cross-sectional profile;

a second layer comprising:
a second width extending in the first direction, a second length extending in the second direction, and a second height extending in the third direction;
a second plurality of passages extending from the first side to the second side, wherein each passage of the second plurality of passages comprises a hexagonal cross-sectional profile;

wherein:

the first and second plurality of passages are adjacent to one another;

the first and second plurality of passages each comprise a first profile in the third direction defined by:

$$y_1 = y_{0_1} + A_y \sin\left(2\pi \frac{z_1}{d_{z,y}}\right);$$

where $y_1$ is the first profile in the third direction, $y_{0_1}$ is a first origination point, $A_y$ is a first amplitude, $z_1$ is a position in the second direction, and $d_{z,y}$ is a first wavelength; and the first and second plurality of passages each comprise a second profile in the first direction defined by:

$$x_1 = x_0 + A_x \sin\left(2\pi \frac{z_1}{d_{z,x}}\right)$$

where $x_1$ is the second profile in the first direction, $x_0$ is a second origination point, $A_x$ is a second amplitude, $z_1$ is a position in the second direction, and $d_{z,x}$ is a second wavelength;

wherein at least one of the passages of the first plurality of passages and at least one of the passages of the second plurality of passages each have a plurality of columns located therein, the columns spaced apart from one another and extending along the length of their respective passages, and the columns extending across their respective passages.

12. The heat exchanger core of claim 11, wherein the first and second amplitude are not equal.

13. The heat exchanger core of claim 11, wherein the first and second wavelength are not equal.

14. The heat exchanger core of claim 11, wherein at least one column of the plurality of columns comprises:
an arch defined by:

$$z_{arch} = z_0 + A_{arch} \sin^2\left(2\pi \frac{y}{d_{arch}}\right);$$

where $z_{arch}$ is a profile of the arch for the at least one column, $z_0$ is a starting position in the second direction, $A_{arch}$ is the amplitude, $y$ is a position in the third direction, and $d_{arch}$ is the wavelength.

15. The heat exchanger core of claim 11, further comprising a macro-scale form factor defined by:

$$y_{arch} = y_{0_2} + A_{arch} \sin\left(2\pi \frac{z_2}{d_{arch}}\right);$$

where $y_{arch}$ is the macro-scale form factor in the third direction, $y_{0_2}$ is a macro-scale form factor origination point, $A_{arch}$ is a macro-scale form factor amplitude, $z_2$ is a position in the second direction, and $d_{arch}$ is a macro-scale form factor wavelength.

16. The heat exchanger core of claim 11, further comprising a macro-scale form factor defined by:

$$y = y_{0_3} + \frac{L}{1 + e^{-k(z_4 - z_{mid})}};$$

where y is the macro-scale form factor in the third direction, $y_{0_3}$ is a macro-scale form factor origination point, $z_4$ is a position in the second direction, $z_{mid}$ is a value in the second direction at the midpoint of y, L is a maximum value of a curve following the macro-scale form factor y, and k is a steepness of the curve following the macro-scale form factor y.

\* \* \* \* \*